(12) United States Patent
Shimo et al.

(10) Patent No.: US 7,569,644 B2
(45) Date of Patent: Aug. 4, 2009

(54) PAINT COMPOSITION, PROCESS FOR PRODUCING TRANSPARENT PROTECTIVE FILM USING THE SAME, AND ORGANIC GLASS PROVIDED WITH TRANSPARENT PROTECTIVE FILM

(75) Inventors: Toshihisa Shimo, Kariya (JP); Hidetaka Hayashi, Kariya (JP); Reiko Saito, Fujisawa (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 510 days.

(21) Appl. No.: 11/057,984

(22) Filed: Feb. 14, 2005

(65) Prior Publication Data

US 2005/0182226 A1 Aug. 18, 2005

(30) Foreign Application Priority Data

Feb. 18, 2004 (JP) ............................. 2004-041896

(51) Int. Cl.
*C08F 287/00* (2006.01)
(52) U.S. Cl. ...................................... 525/446
(58) Field of Classification Search ................. 525/446
See application file for complete search history.

(56) References Cited

U.S. PATENT DOCUMENTS

| 5,750,628 | A | * | 5/1998 | Becker et al. ................. 528/25 |
| 2002/0015851 | A1 | | 2/2002 | Higuchi et al. ............... 428/447 |
| 2003/0083453 | A1 | * | 5/2003 | Lukacs et al. ................. 528/10 |
| 2005/0036931 | A1 | * | 2/2005 | Garcia et al. ................ 423/345 |

FOREIGN PATENT DOCUMENTS

| JP | 9-175868 | 7/1997 |
| WO | WO 01/44371 | 6/2001 |

* cited by examiner

*Primary Examiner*—Callie E Shosho
*Assistant Examiner*—Elizabeth Robinson
(74) *Attorney, Agent, or Firm*—Locke Lord Bissell & Liddell LLP

(57) ABSTRACT

A paint composition includes a raw polymer, and a dry solvent for dissolving the raw polymer. The raw polymer is composed of a transparent polymer having a hydroxyl group, and polysilazane. The polysilazane is included in an amount of 10% by weight or more with respect to the entire raw polymer taken as 100% by weight. Also disclosed are a process for producing a transparent protective film using the paint composition, and organic glass using the same. Note that the organic glass exhibits a surface hardness of 0.4 GPa or more.

5 Claims, 1 Drawing Sheet

PAINT COMPOSITION, PROCESS FOR PRODUCING TRANSPARENT PROTECTIVE FILM USING THE SAME, AND ORGANIC GLASS PROVIDED WITH TRANSPARENT PROTECTIVE FILM

BACKGROUND OF THE INVENTION

1. Field of the Invention

The present invention relates to a protective film for various members. More particularly, it relates to a paint composition, a process for producing a transparent protective film using the same, and organic glass provided with a transparent protective film.

2. Description of the Related Art

Silicone-based films have been used widely as protective films for various members, because they are good in terms of the heat resistance, wear or abrasion resistance and insulative property. The silicone-based films are usually siloxane-based cured paint films, and are formed by dehydrative condensation of alkoxysilanes using the sol-gel process. However, the silicone-based films produced by the sol-gel process have lattice defects in the silica network-shaped structure, and exhibit physical properties different from those of quartz glass. Moreover, when giving the silicone-based films physical properties equivalent to those of quartz glass, it is required to remove the lattice defects from the silicone-based films by sintering them at a high temperature of 200° C. or more. Accordingly, the silicone-based films produced by the sol-gel process are not desirable for applications to members made of resins whose heat resistance is poor. Consequently, it has been carried out recently to use precursor polymers, such as polysilazane, which undergo the conversion reaction into silica even at room temperature in order to produce synthetic silica whose physical properties are equivalent to those of quartz glass.

Note that the superficial wear or abrasion resistance of members to sliding operations depends on the surface hardness of members. However, high-hardness films using polysilazane independently are likely to crack or come off from the substrate. Hence, Japanese Unexamined Patent Publication (KOKAI) No. 9-175,868 discloses to mix polysilazane with an organic polymer, such as acrylic resins, in order to improve the wear or abrasion resistance of the resulting hard coat films by increasing the film thickness thereof.

However, when polysilazane is simply mixed with acrylic resins as disclosed in Japanese Unexamined Patent Publication. (KOKAI) No. 9-175,868, phase separation occurs so that the resulting mixtures are inhomogeneous mixtures in which the components are not mixed with each other. When such inhomogeneous mixtures are turned into hard coat films, the resultant hard coat films become clouded. Moreover, no hard coat films can be produced which exhibit a sufficient degree of transparency, because they are so thickened that the particles of polysilazane have scattered light. Thus, it is difficult to produce a protective film, which exhibits high transparency and a high surface hardness simultaneously, using the process disclosed in Japanese Unexamined Patent Publication (KOKAI) No. 9-175,868.

SUMMARY OF THE INVENTION

The present invention has been developed in view of the aforementioned circumstances. The inventors of the present invention invented successfully a novel paint composition which can solve the above-described problems. It is therefore an object of the present invention to provide a paint composition which can produce transparent protective films exhibiting a high surface hardness as well upgraded wear or abrasion resistance without thickening them, a process for producing a transparent protective film using the same, and organic glass provided with a transparent protective film.

A paint composition according to the present invention comprises:
  a raw polymer composed of a transparent polymer having a hydroxyl group, and polysilazane, the polysilazane included in an amount of 10% by weight or more with respect to the entire raw polymer taken as 100% by weight; and
  a dry solvent for dissolving the raw polymer.

In the present paint composition, the transparent polymer can preferably comprise a component having a hydroxyl group in an amount of 2 parts by mol or more with respect to the transparent polymer taken as 100 parts by mol.

In the present paint composition, the raw polymer can preferably be composed of the polysilazane in an amount of 15% by weight or more with respect to the entire raw polymer taken as 100% by weight. In this instance, the transparent polymer can preferably comprise a component having a hydroxyl group in an amount of 2 parts by mol or more with respect to the transparent polymer taken as 100 parts by mol.

The phrase, "comprise a component having a hydroxyl group in an amount of 2 parts by mol or more," means a content proportion of a monomer having one hydroxyl group in the transparent polymer when the transparent polymer is a polymerized substance which is composed of a transparent resin and the monomer introduced into the transparent resin. Therefore, when the polymerized substance is composed of a transparent resin and a monomer having two hydroxyl groups and introduced into the transparent resin, the content proportion of the monomer can be reduced by half, and accordingly can be 1 part by mol or more. Note that, however, the transparent polymer is not limited to the polymerized substance which is composed of a transparent resin and monomers having a certain number of hydroxyl groups and introduced into the transparent resin. More specifically, it is possible to say that the phrase designates the number proportion of hydroxyl groups in the transparent polymer.

A process according to the present invention for producing a transparent protective film using the present paint composition comprises the steps of:
  preparing a paint composition in an inert atmosphere, the paint composition comprising:
    a raw polymer composed of a transparent polymer having a hydroxy group, and polysilazane, the polysilazane included in an amount of 10% by weight or more with respect to the entire raw polymer taken as 100% by weight; and
    a dry solvent for dissolving the raw polymer;
  coating the paint composition on a surface of a substrate; and
  curing the paint composition not only by converting the polysilazane into silica but also by bonding at least one oxygen atom of the resulting silica with the hydroxyl group of the transparent polymer, thereby turning the paint composition into a transparent protective film.

In the present process, the transparent polymer can preferably comprise a component having a hydroxyl group in an amount of 2 parts by mol or more with respect to the transparent polymer taken as 100 parts by mol.

Moreover, the raw polymer can preferably be composed of the polysilazane in an amount of 15% by weight or more with respect to the entire raw polymer taken as 100% by weight. In this instance, the transparent polymer can preferably comprise a component having a hydroxyl group in an amount of 2 parts by mol or more with respect to the transparent polymer taken as 100 parts by mol.

Organic glass provided with a transparent protective film according to the present invention comprises:
- a resinous substrate exhibiting transparency; and
- a transparent protective film formed on a surface of the resinous substrate, composed of an organic-inorganic nano-composite, and exhibiting a surface hardness of 0.4 GPa or more, the nano-composite comprising:
  - an organic portion composed of a transparent polymer having a hydroxyl group; and
  - an inorganic portion composed of silica whose at least one oxygen atom of the silica is bonded with the hydroxyl group of the transparent polymer.

In the present organic glass, the resinous substrate can preferably comprise polycarbonate. Moreover, the transparent protective film can preferably have a film thickness of 10 μm or less.

As described above, the paint composition according to the present invention comprises a raw polymer composed of a transparent polymer having a hydroxyl group and polysilazane, and a dry solvent for dissolving the raw polymer. The transparent polymer having a hydroxyl group bonds with the molecule of the polysilazane, which is dissolved in the dry solvent, and thereby the molecules of the polysilazane are fixed to the transparent polymer. Accordingly, macroscopic phase separation is inhibited from occurring. However, the transparent polymer and the molecules of the polysilazane undergo phase separation microscopically. Consequently, the transparent protective film resulting from the present paint composition can reduce the light scattering caused by the particles of silica which is converted from the molecules of the polysilazane. As a result, it is possible to upgrade the transparency of the resultant transparent protective film.

Moreover, the paint composition according to the present invention comprises polysilazane. Polysilazane can produce transparent protective films of high surface hardness, because it is turned into silica. Note that the conversion reaction from polysilazane into silica can develop even at room temperature. Accordingly, it is not required at all to process the present paint composition at high temperatures. Consequently, the transparent polymer making the present paint composition together with the polysilazane is less likely to be deteriorated in processing the present paint composition. In addition, it is possible to form transparent protective films even on substrates of poor heat resistance or assembled component parts.

When the present paint composition comprises the polysilazane in an amount of 10% by weight or more with respect to the entire raw polymer taken as 100% by weight, the present paint composition can produce transparent protective films of high surface hardness. In this instance, when the transparent polymer comprises a component having a hydroxyl group in an amount of 2 parts by mol or more with respect to the transparent polymer taken as 100 parts by mol, the dispersed state of the polysilazane becomes favorable so that the present paint composition can produce transparent protective films of higher surface hardness and higher transparency.

Moreover, when the present paint composition comprises the polysilazane in an amount of 15% by weight or more with respect to the entire raw polymer taken as 100% by weight, the present paint composition can produce transparent protective films of further enhanced high surface hardness. In this instance, when the transparent polymer comprises a component having a hydroxyl group in an amount of 2 parts by mol or more with respect to the transparent polymer taken as 100 parts by mol, the dispersed state of the polysilazane becomes more favorable so that the present paint composition can produce transparent protective films of much higher surface hardness and much higher transparency.

The present organic glass comprises a transparent protective film. The transparent protective film is formed on a resinous substrate exhibiting transparency. Moreover, the transparent protective film is composed of an organic-inorganic nano-composite. The organic-inorganic nano-composite comprises an organic-portion composed of a transparent polymer having a hydroxyl group, and an inorganic portion composed of silica whose at least one oxygen atom is bonded with the hydroxyl group of the transparent polymer. The transparent protective film composed of the organic-inorganic nano-composite can reduce the light scattering resulting from the inorganic portion so that it exhibits a high degree of transparency. In addition, the present organic glass exhibits a high surface hardness, because it is provided with the transparent protective film whose inorganic portion is composed of silica.

Specifically, the present organic glass comprises the transparent protective film whose surface hardness is 0.4 GPa or more. Accordingly, the present organic glass is not only lightweight, but also exhibits mechanical characteristics equivalent to those of inorganic glass. Moreover, when the present organic glass comprises the transparent protective film whose film thickness is 10 μm or less, it is possible to inhibit the transparent protective film from adversely affecting the transparency of the resinous substrate, and thereby it is possible to maintain the transparency of the resinous substrate.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

Figure 2:
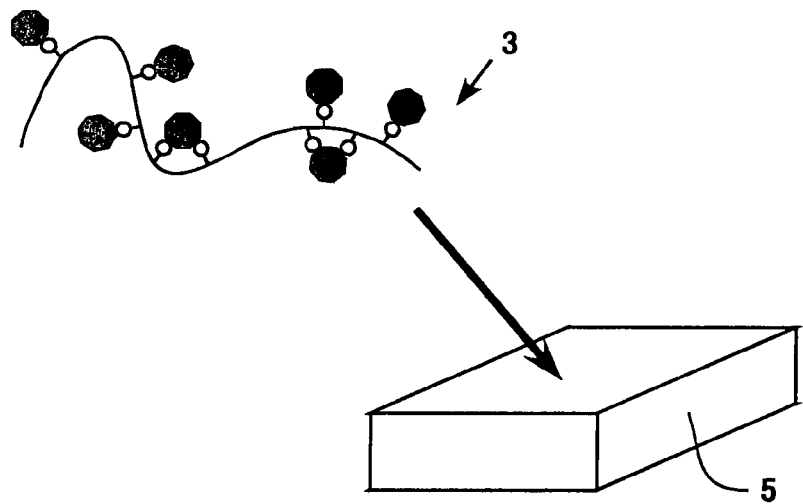
FIG. 2 is a conceptual diagram for illustrating a coating step of a process for producing a transparent protective film according to an example of the present invention using the present paint composition.
Figure 3:
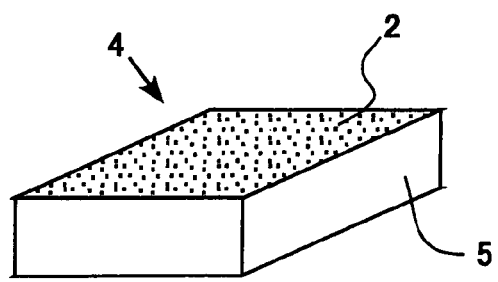
FIG. 3 is a conceptual diagram for illustrating a curing step of the present process using the present paint composition.

Hereinafter, preferable embodiment modes for carrying out the present paint composition, process for producing a transparent protective film using the same and organic glass provided with a transparent protective film will be described with reference to the accompanying FIGS. 1 through 3. Note that the drawings are conceptual diagrams relating to a synthesis of an organic-inorganic nano-composite (or transparent protective film) using the present paint composition.

Paint Composition

The present paint composition comprises a raw polymer, and a dry solvent. The raw polymer is composed of a transparent polymer having a hydroxyl group, and polysilazane. The dry solvent is for dissolving the raw polymer.

The transparent polymer is not limited in particular as far as it is transparent polymers which have a hydroxyl group. For example, as the transparent polymer, it is possible to use polystyrenes having a hydroxyl group, and acrylic resins having a hydroxyl group.

Moreover, the transparent polymer can be polymerized substances which comprise a transparent resin, and a monomer having a hydroxyl group and introduced into the transparent resin. When a monomer having a hydroxyl group is introduced into a transparent resin, it is possible to control the quantity of hydroxyl group possessed by the transparent polymer and the introduction position of hydroxyl group in the transparent polymer.

As for the transparent polymer, it is possible to use polystyrene resins free from hydroxyl group, acrylic resins, poly(vinyl pyridine), and poly(vinyl carbasole). The polystyrene resins free from hydroxyl group can be poly(chloromethyl styrene), and poly(α-methyl styrene). Note that the polystyrene resins free from hydroxyl group further include poly(alkoxy styrene), such as poly(methoxy styrene), and halogenated poly(methyl styrene), such as poly(butyromethyl styrene). The acrylic resins can be poly(methyl methacrylate), poly(ethyl methacrylate), and poly(methyl acrylate). Moreover, in addition to above, it is possible to use the following resins as far as they exhibit transparency: polycarbonate, cycloolefine resins, cycloaliphatic olefine resins, cyclic olefine resins, cycloaliphatic acrylic resins, polyallylate resins, and olefinic maleimide resins. Note that two or more of these transparent resins can be mixed to use.

The monomer having a hydroxyl group can be monomers for producing polystyrenes having a hydroxyl group, monomers for producing acrylic resins having a hydroxyl group, and monomers for producing acrylamide resins having a hydroxyl group. For example, the monomers for producing the polystyrenes can be 3-vinyl phenol, hydroxymethyl styrene, 4-vinylbenzyle-4-hydroxybuthyl ether, 4-(hydroxymethylsilylphenyl) styrene. The monomers for producing the acrylic resins can be hydroxyethyl methacrylate. The monomers for producing the acrylamide resins can be N-(4-(4-hydroxyphenylsulfonyl) phenoxycarbonyl) methacrylamide. Note that two or more of these monomers having a hydroxyl group can be mixed to use.

The process for polymerizing the polymerized substance, which comprises the transparent resin and the monomer having a hydroxyl group and introduced into the transparent resin, is not limited in particular. A polymerizing process can be selected appropriately depending on the types of selected transparent resin and monomer having a hydroxyl group. For example, the polymerized substance can be usually synthesized by such processes as radical polymerization, anionic polymerization, cationic polymerization, methasesis polymerization, and living cationic polymerization.

The polysilazane is a polymerized substance which is expressed by a chemical formula, $(-Si-N-)_n$. Hydrogen atoms or organic groups are usually bonded with two of the bonds in the Si (i.e., tetravalent silicon atom) and one of the bonds in the N (i.e., trivalent nitrogen atom). Moreover, the other constituent silicon atoms and/or nitrogen atoms of the polysilazane can be bonded with the bonds in the Si and/or N. If such is the case, the polysilazane is turned into polysilazane which has cyclic structures or cross-linked structures. Moreover, the polysilazane decomposes in the presence of oxygen to undergo a conversion reaction in which oxygen atoms substitute for the nitrogen atoms of polysilazane, and produces silica. Thus, the polysilazane cures by conversion, and turns into silica which is substantially free from nitrogen atom.

The polysilazane used in the present paint composition is not limited in particular as far as it is polysilazane which has been used in forming silica coatings. For example, perhydropolysilazane (hereinafter abbreviated to as "PHPS") can be an especially preferable option. PHPS is polysilazane appropriate for the present invention, because it exhibits a low curing temperature. Moreover, it is possible to use partially methylated PHPS. Note that two or more kinds of polysilazane can be mixed to use.

The present paint composition comprises the polysilazane in an amount of 10% by weight or more with respect to the entire raw polymer, which is composed of the transparent polymer and the polysilazane, taken as 100% by weight. When the polysilazane content is less than 10% by weight with respect to the entire raw polymer taken as 100% by weight, the resulting paint compositions cannot produce a protective film which exhibits a sufficient surface hardness. In the present paint composition, the transparent polymer can preferably comprise a component having a hydroxyl group in an amount of 2 parts by mol or more with respect to the transparent polymer taken as 100 parts by mol. The present paint composition, which includes the transparent polymer comprising a component having a hydroxyl group in an amount of 2 parts by mol or more with respect to the transparent polymer taken as 100 parts by mol, can effectively inhibit the macroscopic phase separation between the transparent polymer and the polysilazane from occurring, and can make the dispersibility of the polysilazane favorable. As a result, the present paint composition can produce transparent protective films which exhibit not only a high surface hardness but also high transparency.

Preferably, the present paint composition can comprise the polysilazane in an amount of 15% by weight or more with respect to the entire raw polymer, which is composed of the transparent polymer and the polysilazane, taken as 100% by weight. The present paint composition comprising the polysilazane in an amount of 15% by weight or more with respect to the entire raw polymer taken as 100% by weight can produce protective films of higher surface hardness. In this instance as well, the transparent polymer can preferably comprise a component having a hydroxyl group in an amount of 2 parts by mol or more with respect to the transparent polymer taken as 100 parts by mol. The present paint composition, which includes the transparent polymer comprising a component having a hydroxyl group in an amount of 2 parts by mol with respect to the transparent polymer taken as 100 parts by mol, can more effectively inhibit the macroscopic phase separation between the transparent polymer and the polysilazane from occurring, and can make the dispersibility of the polysilazane more favorable. As a result, the present paint composition can produce transparent protective films which exhibit not only a much higher surface hardness but also higher transparency.

As described above, when the transparent polymer comprises a transparent resin and a monomer having a hydroxyl group and introduced into the transparent resin, it is possible to control the size of the transparent polymer and the content and introduction position of the hydroxyl group possessed by the transparent polymer. As a result, it is possible to control the distances between the neighboring hydroxyl groups, to combine two or more hydroxyl groups, which neighbor with each other in the same transparent polymer molecules, with the polysilazane molecules, and to fix the polysilazane molecules onto specific parts of the transparent polymer. Moreover, when adjusting the molecular weight of the monomer having a hydroxyl group or selecting the other functional groups to be possessed by the monomer, it is possible to add the other functions to the resulting present paint composition. Note that, in view of the formability, the transparent polymer can desirably exhibit a number average molecular weight of 3,000 or more. In addition, the distance between the neighboring hydroxyl groups can preferably be 1.5 nm or more.

The dry solvent is not limited in particular as far as it is free from water and can dissolve the raw polymer. It is not preferable for a solvent for dissolving the raw material to contain water, because the reaction, specifically, gelation, has developed between the transparent polymer and the polysilazane. Accordingly, it is advisable to use dry solvents whose water contents are removed by such methods as using drying agents. Moreover, when using the present paint composition to coat various substrates therewith, it is necessary to use dry solvents which are inactive to the substrates. Tetrahydrofuran is an especially preferable option as the dry solvent used in the present paint composition. When the substrates are made of resins, ethylaceate is a preferable option. When the substrates exhibit high resistance to organic solvents, it is possible to use benzene, toluene, xylene, pyridine, 1,4-dioxane, dimethyl sulfoxide and chloroform.

Note that the present paint composition is not limited to the aforementioned embodiment modes. For example, in order to provide the present paint composition with the other functions, it is advisable to mix the present paint composition with the other substances such as drying facilitating agents, ultraviolet absorbing agent and antistatic agents.

Process for Producing Transparent Protective Film Using Paint Composition

The present process for producing a transparent paint film using the present paint composition comprises the steps of:
preparing the above-described present paint composition in an inert atmosphere:
coating the paint composition on a surface of a substrate; and
curing the paint composition not only by converting the polysilazane into silica but also by bonding at least one oxygen atom of the resulting silica with the hydroxyl group of the transparent polymer, thereby turning the paint composition into a transparent protective film.

In the preparing step, the present paint composition is prepared in an inert atmosphere. As described above, the present paint composition has undergone the reaction, specifically, gelation, between the transparent polymer and the polysilazane in the presence of water. Moreover, the polysilazane has undergone the conversion into silica in the presence of oxygen. Accordingly, it is necessary to prepare the present paint composition in an inert atmosphere in which the transparent polymer and polysilazane exhibit low reactivities to each other. For example, it is desirable to prepare the present paint composition in an inert atmosphere such as in nitrogen or noble gases which are free from oxygen.

In the coating step, the present paint composition is coated on a surface of a substrate. The types of the substrate are not limited in particular. For example, it is possible to coat the present paint composition on metallic substrates or resinous substrates. The resinous substrates can desirably be made of engineering plastics such as polycarbonate, polyacetal, polyamide, polymethyl methacrylate and polymethly acrylate. Moreover, the coating method for coating the present paint composition on a surface of a substrate is not limited in particular. For instance, as for the coating method, it is possible to name simple applying methods, spray coating methods, flow coating methods, spin coating methods, and dip coating methods.

In the curing step, not only the polysilazane is converted into silica but also at least one oxygen atom of the resulting silica is bonded with the hydroxyl group of the transparent polymer, thereby turning the present paint composition into a transparent protective film.

Figure 1:
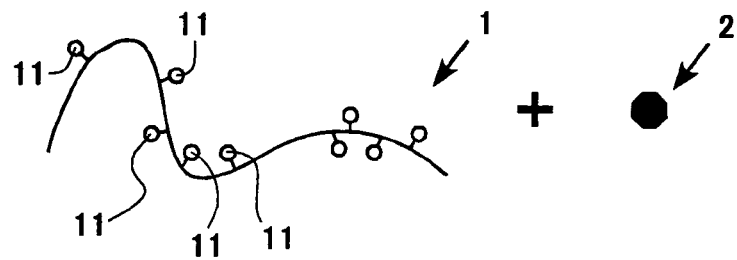
FIG. 1 is a conceptual diagram for illustrating a process for synthesizing an organic-inorganic nano-composite using a paint composition according to an example of the present invention.

As illustrated in FIG. 1, the present paint composition comprises a transparent polymer 1 and polysilazane 2 which are present in microscopic phase separation. As illustrated in FIG. 2, when the present paint composition is coated onto a substrate 5 in the presence of water (for example, water vapor in air), the molecules of the polysilazane 2 react with the transparent polymer 1 so that the present paint composition turns into a gel. In this instance, a copolymer 3, specifically, a grafted copolymer is made which comprises a trunk block composed of the transparent polymer 1 and branch blocks composed of the molecules of the polysilazane 2 bonded with the trunk block. In certain cases, the molecules of the polysilazane 2 are cross-linked with the transparent polymer 1. Thereafter, not only the dry solvent evaporates, but also the molecules of the polysilazane 2 are converted into silica 2', that is, the oxygen atom substitutes for the nitrogen atom of the polysilazane 2. Thus, as illustrated in FIG. 3, a transparent protective film 4 is produced in which at least one oxygen atom of the silica 2' is bonded with the hydroxyl group 11 of the transparent polymer 1.

Moreover, it is possible to facilitate the curing of the present paint composition, specifically, the conversion reaction of the polysilazane, by sintering the present paint composition in the curing step as far as the sintering is carried out at a temperature falling in a range which does not degrade the transparent polymer in the present paint composition and the substrates coated therewith. Note that the present paint composition does not lose the microscopic phase-separation structure when the sintering is carried out at a glass transition temperature of polysilazane or less.

Organic Glass Provided with Transparent Protective Film

The present organic glass is formed on a surface of a resinous substrate exhibiting transparency, and is provided with a transparent protective film produced by the above-described present production process. Therefore, it is possible to produce the present organic glass using the present paint composition.

In the present organic glass, the resinous substrate exhibiting transparency can preferably be made of engineering plastics. For example, polycarbonate is an especially preferable option.

Moreover, the transparent paint film is composed of an organic-inorganic nano-composite. The organic-inorganic nano-composite comprises an organic portion, and an inorganic portion. The organic portion is composed of a transparent polymer having a hydroxyl group. The inorganic portion is composed of silica, and at least one oxygen atom of the silica is boned with the hydroxyl group of the transparent polymer.

As described in the paragraph captioned "(Process for Producing Transparent Protective Film Using Paint Composition)," no macroscopic phase separation is observed in the present paint composition. However, the copolymer 3, which is composed of the transparent polymer 1 and the molecules of the polysilazane 2, is synthesized in a microscopically phase-separated state, and is turned into a gel as illustrated in FIG. 2. Thereafter, the polysilazane 2 is turned into the silica 2' to form the organic-inorganic nano-composite 4 in which at least one oxygen atom of the silica 2' is boned with the hydroxyl group of the transparent polymer 1. Specifically, the organic portion of the organic-inorganic nano-composite 4 is composed of the present paint. composition's transparent polymer 1 having a hydroxyl group, and the inorganic portion of the organic-inorganic nano-composite 4 is composed of the silica 2' into which the present paint composition's polysilazane 2 is converted.

The transparent protective film composed of the organic-inorganic nano-composite exhibits a high degree of transparency because the inorganic portion of the organic-inorganic nano-composite is so fine that it does not affect the diffraction of transmitting light. As a result, the present organic glass provided with the transparent protective film composed of the organic-inorganic nano-composite is adapted to be organic glass which exhibits a high degree of transparency. Moreover, the transparent protective film composed of the organic-inorganic nano-composite not only exhibits a high surface hardness but also is less likely to crack and come off from the resinous substrate. Thus, the transparent protective film has the properties of the organic portion and inorganic portion combindedly.

Moreover, the present organic glass exhibits a surface hardness of 0.4 GPa or more. When the surface hardness is 0.4 GPa or more, the present organic glass is so good in terms of the abrasion or wear resistance that it is appropriate for applications to automotive windshields such as rear windshields, sunroofs and moonroofs.

In addition, even when the transparent protective film has a film thickness of 10 μm or less, the present organic film exhibits good abrasion or wear resistance. Therefore, even if the transparency degree of the resinous substrate is higher than the transparency degree of the transparent protective film, the resinous substrate can retain the transparency without being adversely affected by the transparent protective film because it is not required to increase the thickness of the transparent protective film more than 10 μm. Thus, the present organic glass is adapted to be organic glass which exhibits a high degree of transparency as well as a high surface hardness.

EXAMPLES

The present invention will be hereinafter described with reference to specific examples and comparative examples using Tables 1 and 2 below.

Preparation of Paint Compositions

As the transparent polymer, poly(methyl methacrylate-co-hydroxyethyl methacrylate) was synthesized by atom transfer radical polymerization. The resulting transparent polymer was labeled "$P_1$." Note that the transparent polymer "$P_1$" comprised methyl methacrylate in an amount of 85.5% by mol, and hydroxyehtyl methacrylate in an amount of 14.5% mol; and exhibited a number average molecular weight of $4.5 \times 10^4$.

Moreover, as another one of the transparent polymer, poly (styrene-co-butoxy styrene-co-4-vinyl phenol) was synthesized by atom transfer radical polymerization. The resulting transparent polymer was labeled "$P_2$." Note that the transparent polymer "$P_2$" comprised styrene in an amount of 92.7% by mol, butoxy styrene in an amount of 3.8% by mol, and 4-vinyl phenol in an amount of 3.5% mol; and exhibited a number average molecular weight of $3.0 \times 10^4$.

In addition, as still another one of the transparent polymer, polystyrene-block-poly(4-vinyl phenol) was synthesized by atom transfer radical polymerization. The resulting transparent polymer was labeled "$P_3$." Note that the transparent polymer "$P_3$" comprised styrene in an amount of 86.4% by mol, and 4-vinyl phenol in an amount of 13.6% mol; and exhibited a number average molecular weight of $14.5 \times 10^4$.

Note that the molar fractions of the respective components in the transparent polymers "$P_1$" through "$P_3$" were measured by a nuclear magnetic resonance (i.e., NMR) method using $^1H$ atom. Moreover, the number average molecular weights of the transparent polymers "$P_1$" through "$P_3$" were measured by gel permeation chromatography (i.e., GPC).

Then, the transparent polymers "$P_1$" through "$P_3$" were dissolved in tetrahydrofuran, the dry solvent which was dehydrogenated with metallic sodium, respectively. Thereafter, the resulting solutions were added to a perhydropolysilazane-xylene solution and stirred therewith at room temperature in a nitrogen atmosphere for 24 hours. Note that the perhydropolysilazane-xylene solution was "NN-110" produced by CLARIANT Japan Co. Ltd.; the perhydropolysilazane (hereinafter abbreviated to as "PHPS") concentration was 20% by weight; and the number average molecular weight of the "PHPS" was 700. Thus, 13 kinds of paint compositions labeled "$P_1$-0" through "$P_1$-5," "$P_2$-0" through "$P_2$-2," and "$P_3$-0" through "$P_3$-3" were prepared whose "PHPS"-xylene solution contents were different with each other.

Moreover, the transparent polymer "$P_1$" was dissolved in dry ethyl acetate, another one of the dry solvent. Thereafter, the resulting solution was added to a "PHPS"-xylene solution and stirred therewith similarly. Thus, 6 kinds of paint compositions labeled "$P_1$-0'" through "$P_1$-5'" were prepared whose "PHPS"-xylene solution contents were different with each other.

Note that Table 1 below summarizes the preparation conditions of the transparent polymers, the dry solvents, and the "PHPS"-xylene solutions. Moreover, the column of Table 1 designated with "Polysilazane" specifies the weight percentages (e.g., calculated weight percentage values) of the "PHPS" with respect to the summed weights of the transparent polymers and "PHPS."

TABLE 1

| Paint Identification | Transparent Polymer | Monomer having Hydroxy Group | Weight of Transparent Polymer (g) | NN-110 (mL) | Polysilazane (% by Weight) | Dry Solvent |
|---|---|---|---|---|---|---|
| $P_1$-0 | $P_1$ | 14.5 mol % - hydroxyethyl methacrylate | 1.0 | 0 | 0 | 100 mL-tetrahydrofuran |
| $P_1$-1 | | | 1.0 | 1.06 | 16.0 | |
| $P_1$-2 | | | 1.0 | 2.64 | 32.2 | |
| $P_1$-3 | | | 1.0 | 5.31 | 48.9 | |
| $P_1$-4 | | | 1.0 | 7.90 | 58.7 | |

TABLE 1-continued

| Paint Identification | Transparent Polymer | Monomer having Hydroxy Group | Weight of Transparent Polymer (g) | NN-110 (mL) | Polysilazane (% by Weight) | Dry Solvent |
|---|---|---|---|---|---|---|
| $P_1$-5 | | | 1.0 | 26.4 | 82.6 | |
| $P_2$-0 | $P_2$ | 3.5 mol % - 4-vinyl phenol | 1.0 | 0 | 0 | |
| $P_2$-1 | | | 1.0 | 0.53 | 8.7 | |
| $P_2$-2 | | | 1.0 | 0.95 | 14.6 | |
| $P_3$-0 | $P_3$ | 13.6 mol % - 4-vinyl phenol | 1.0 | 0 | 0 | |
| $P_3$-1 | | | 1.0 | 1.78 | 24.3 | |
| $P_3$-2 | | | 1.0 | 3.52 | 38.8 | |
| $P_3$-3 | | | 1.0 | 5.36 | 49.1 | |
| $P_1$-0' | $P_1$ | 14.5 mol % - hydroxyethyl methacrylate | 1.0 | 0 | 0 | 19 g-ethyl acetate |
| $P_1$-1' | | | 1.0 | 1.13 | 16.9 | |
| $P_1$-2' | | | 1.0 | 2.61 | 32.0 | |
| $P_1$-3' | | | 1.0 | 5.36 | 49.1 | |
| $P_1$-4' | | | 1.0 | 7.82 | 58.5 | |
| $P_1$-5' | | | 1.0 | 26.8 | 82.8 | |

Production of Transparent Protective Film

The thus prepared paint compositions "$P_1$-0" through "$P_1$-5," "$P_2$-0" through "$P_2$-2," and "$P_3$-0" through "$P_3$-3" were coated on a surface of a glass plate by a dip coating method, and were dried at room temperature for 24 hours, respectively. Note that the size of the glass plate was 76 mm×26 mm×1 mm. Thereafter, the glass plates with the paint compositions coated were stored at room temperature for 1 weeks. Thus, transparent protective films were produced on the glass plates, respectively. The resulting glass plates provided with the transparent protective films were labeled Samples "$G_1$-0" through "$G_1$-5," "$G_2$-0" through "$G_2$-2," and "$G_3$-0" through "$G_3$-3," respectively.

Moreover, paint compositions "$P_1$-0'" through "$P_1$-5'" were coated on a surface of a resinous plate by a dip coating method, and were dried preliminarily at room temperature, respectively. Note that the resinous plate was a polycarbonate sheet ("IUPILON S-2000 (Trademark)" produced by MITSUBISHI ENGINEERING-PLASTIC Corp.) which was injection molded, and had a size of 100 mm×150 mm×4 mm. Thereafter, the resinous plates with the paint compositions coated were sintered at 100° C. in water vapor for 1 hour. Thus, transparent protective films were produced on the resinous plates, respectively. The resulting resinous plates provided with the transparent protective films were labeled Samples "$R_1$-0'" through "$R_1$-5'" respectively.

Note that Table 2 below summarizes the film thickness of the respective transparent protective films.

Evaluation

The respective samples produced in accordance with the above described procedures were subjected to a surface hardness measurement in order to evaluate their transparent protective films. The surface hardness of the transparent protective films was measured by a nano-indentation method. "TORIBO SCOPE" produced by HYSITORON Corp. was used as the nano-indenter. Moreover, the nano-indenter was installed to an atomic force microscope "SPM9500J2" produced by SHIMADU Corp. Note that the nano-indentation method can measure the transparent protective films' own surface hardness without being affected by the substrates.

Table 2 sets forth the results of the surface hardness measurement. Note that the column of Table 2 designated with "Silica" specifies the weight percentages (e.g., calculated weight percentage values) of silica with respect to the weights of the transparent protective films.

Moreover, the appearances of the respective transparent protective films of the samples were observed visually. According to the visual observation, all of the transparent protective films had good appearances free from turbidity and cracks.

TABLE 2

| Sample Identification | Paint Identification | Hydroxy Group (Parts by Mol) | Polysilazane (% by Weight) | Silica (% by Weight) | Film Thickness (μm) | Surface Hardness (GPa) |
|---|---|---|---|---|---|---|
| $G_1$-0 | $P_1$-0 | 14.5 | 0 | 0 | 4.4 | 0.36 |
| $G_1$-1 | $P_1$-1 | 14.5 | 16.0 | 20.2 | 1.1 | 0.53 |
| $G_1$-2 | $P_1$-2 | 14.5 | 32.2 | 38.7 | 0.7 | 0.77 |
| $G_1$-3 | $P_1$-3 | 14.5 | 48.9 | 56.0 | 1.0 | 0.85 |
| $G_1$-4 | $P_1$-4 | 14.5 | 58.7 | 65.4 | 1.0 | 1.00 |
| $G_1$-5 | $P_1$-5 | 14.5 | 82.6 | 86.3 | 0.8 | 3.82 |
| $G_2$-0 | $P_2$-0 | 3.5 | 0 | 0 | 4.5 | 0.26 |
| $G_2$-1 | $P_2$-1 | 3.5 | 8.7 | 11.2 | 1.1 | 0.29 |
| $G_2$-2 | $P_2$-2 | 3.5 | 14.6 | 18.5 | 1.9 | 0.41 |
| $G_3$-0 | $P_3$-0 | 13.6 | 0 | 0 | 2.1 | 0.27 |
| $G_3$-1 | $P_3$-1 | 13.6 | 24.3 | 29.9 | 2.3 | 0.48 |
| $G_3$-2 | $P_3$-2 | 13.6 | 38.8 | 45.7 | 3.2 | 0.63 |
| $G_3$-3 | $P_3$-3 | 13.6 | 49.1 | 56.2 | 1.1 | 0.74 |
| $R_1$-0' | $P_1$-0' | 14.5 | 0 | 0 | 0.7 | 0.26 |
| $R_1$-1' | $P_1$-1' | 14.5 | 16.9 | 21.3 | 1.1 | 0.32 |

TABLE 2-continued

| Sample Identification | Paint Identification | Hydroxy Group (Parts by Mol) | Polysilazane (% by Weight) | Silica (% by Weight) | Film Thickness (μm) | Surface Hardness (GPa) |
|---|---|---|---|---|---|---|
| $R_1$-2' | $P_1$-2' | 14.5 | 32.0 | 38.5 | 1.2 | 0.47 |
| $R_1$-3' | $P_1$-3' | 14.5 | 49.1 | 56.2 | 1.2 | 0.79 |
| $R_1$-4' | $P_1$-4' | 14.5 | 58.5 | 65.2 | 1.4 | 1.12 |
| $R_1$-5' | $P_1$-5' | 14.5 | 82.8 | 86.5 | 1.7 | 1.46 |

The transparent protective films made from the paint compositions "$P_1$-1" through "$P_1$-5," "$P_2$-1" through "$P_2$-2," "$P_3$-1" through "$P_3$-3" and "$P_1$-1'" through "$P_1$-5'" showed good transparency, and exhibited higher surface hardnesses than the transparent protective films made from the paint compositions "$P_1$-0," "$P_2$-0," "$P_3$-0" and "$P_1$-0'" did. In particular, the paint compositions "$P_1$-1" through "$P_1$-5," "$P_2$-2," "$P_3$-1" through "$P_3$-3" and "$P_1$-1'" through "$P_1$-5'" whose polysilazane weight percentages were 10% by weight or more produced the transparent protective films "$G_1$-1" through "$G_1$-5," "$G_2$-2," "$G_3$-1" through "$G_3$-3" and "$R_1$-1'" through "$R_1$-5'," which exhibited higher surface hardnesses, even when the transparent protective films "$G_1$-1" through "$G_1$-5," "$G_2$2," "$G_3$-1" through "$G_3$-3" and "$R_1$-1'" through "$R_1$-5'" had film thicknesses of 4 μm or less. Moreover, the paint compositions "$P_1$-2'" through "$P_1$-5'" produced the transparent protective films "$R_1$-2'" through "$R_1$-5'," which exhibited surface hardnesses of 0.4 GPa or more, even on the polycarbonate substrate even when the transparent protective films "$R_1$-2'" through "$R_1$-5'" had film thicknesses of 2 μm or less. Note that organic glass which exhibits a surface hardness of 0.4 GPa or more is appropriate for automotive applications.

For comparison, a comparative example of a transparent polymer free from a hydroxyl group was synthesized similarly to the synthesis of the transparent polymer P1, but no hydroxyehtyl methacrylate was introduced into methyl methacrylate. The resulting comparative transparent polymer was made into a comparative paint composition in the same manner as the paint composition "$P_1$-3," and was further made into a comparative transparent protective film in the same manner as the transparent protective film "$G_1$-3." The resulting sample of the comparative transparent protective film was examined for the transmittance of visible light whose wavelength was 600 nm. As a result, the sample of the comparative transparent protective film exhibited a transmittance of 81%, and the value was lower than 90% or more which was exhibited by the above-described transparent protective films made from the sample paint compositions having a hydroxyl group.

Note that the more the polysilazane content is the harder the surface hardness of transparent protective film is. However, the polysilazane content in paint composition is determined while taking not only the surface hardness of transparent protective film but also the production cost thereof and the occurrence of cracks therein into consideration, because polysilazane is expensive. For example, the above-described samples of the transparent protective paint films according to the examples of the present invention did not crack at all when the polysilazane weight percentage in the corresponding samples of the paint compositions was 85% by weight or less.

Having now fully described the present invention, it will be apparent to one of ordinary skill in the art that many changes and modifications can be made thereto without departing from the spirit or scope of the present invention as set forth herein including the appended claims.

What is claimed is:

1. A paint composition, comprising:
   a raw polymer composed of a transparent organic polymer having a hydroxyl group and polysilazane,
   wherein the hydroxyl group bonds with the molecule of the polysilazane, the distance between neighboring hydroxyl groups along the length of the trunk block is at least 1.5 nm, and the polysilazane is included in an amount of 10% by weight or more with respect to the entire raw polymer taken as 100% by weight; and
   a dry solvent for dissolving the raw polymer.

2. The paint composition set forth in claim 1, wherein the transparent organic polymer comprises at least one monomer having a hydroxyl group, wherein the monomer is present in an amount of 2% by mol or more with respect to the transparent organic polymer.

3. The paint composition set forth in claim 1, wherein the raw polymer is composed of the polysilazane in an amount of 15% by weight or more with respect to the entire raw polymer taken as 100% by weight.

4. The paint composition set forth in claim 3, wherein the transparent organic polymer comprises at least one monomer having a hydroxyl group, wherein the monomer is present in an amount of 2% by mol or more with respect to the transparent organic polymer.

5. The paint composition set forth in claim 1, wherein the polysilazane is perhydropolysilazane.

* * * * *